March 18, 1941. P. M. GILMER 2,235,808
PACKING RING
Filed Aug. 3, 1938 2 Sheets-Sheet 1

Inventor
Percy M. Gilmer
By Cyrus Kehr & Swecker
his Attorneys

March 18, 1941.　　　　P. M. GILMER　　　　2,235,808
PACKING RING
Filed Aug. 3, 1938　　　2 Sheets-Sheet 2
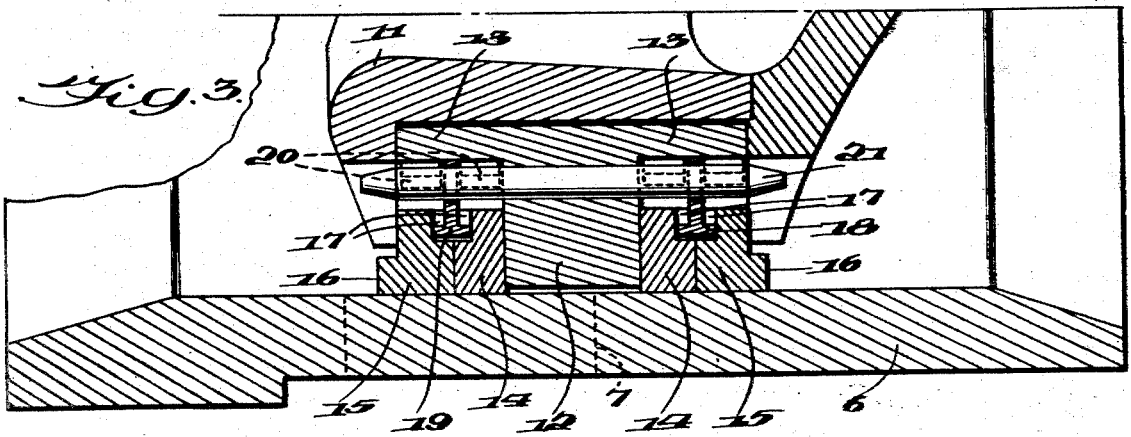
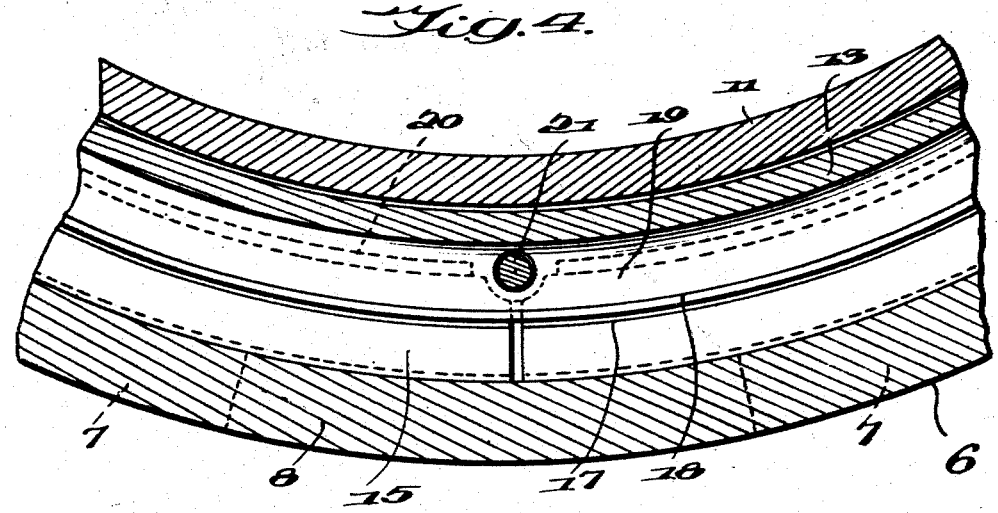
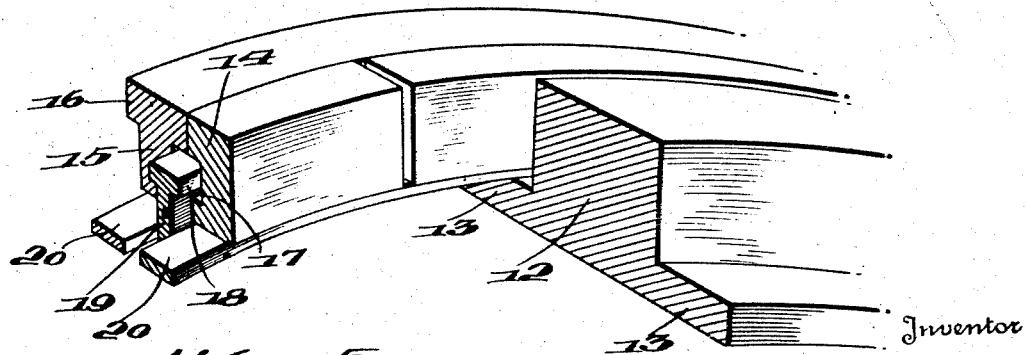
Inventor
Percy M. Gilmer
By Cyrus Kehr & Swecker
his Attorneys Patented Mar. 18, 1941

2,235,808

UNITED STATES PATENT OFFICE 2,235,808

PACKING RING

Percy M. Gilmer, Roanoke, Va., assignor of forty per cent to William D. Staples and James N. Kincanon Application August 3, 1938, Serial No. 222,898

5 Claims. (Cl. 309—29)

This invention relates to an improvement in packing rings, and more particularly to such rings as are used for packing valves of engines, employing steam as a motive fluid, such as locomotives, although they may be used to advantage in other engines and other relations as well.

The object of the invention is to improve the construction of such a packing ring, so that it will be more effective in use and automatically adjusted to take up for wear, may be readily applied or removed either in whole or in sections, and eliminates the building up of carbon in the packing ring or between the same and the adjacent portions of the division ring.

This object is accomplished by utilizing sectional packing rings held in place by a retainer ring mounted therebetween with an overlapped engagement between opposing faces thereof, and such packing rings are pressed outward by springs bearing against the inner edges thereof. Such a packing ring is provided at each of the steam edge and exhaust edge of the valve with a division ring therebetween. The straight side faces between the packing rings eliminate the building up of carbon in the grooves of the division ring since the retainer ring is in the middle and any oil in the cylinder will be wiped off at opposite edges of the packing rings rather than at the center. Outward expansion of the packing rings is permitted by a clearance between the same and the retainer ring.

I have illustrated a preferred embodiment of this invention in the accompanying drawings in which:

Fig. 3 is a similar view through the lower portion of the valve and bushing;

Fig. 4 is a cross-section thereof, approximately at right angles to Fig. 3; and

Fig. 5 is a detail perspective view of portions of the packing ring and division ring.

Figure 1:
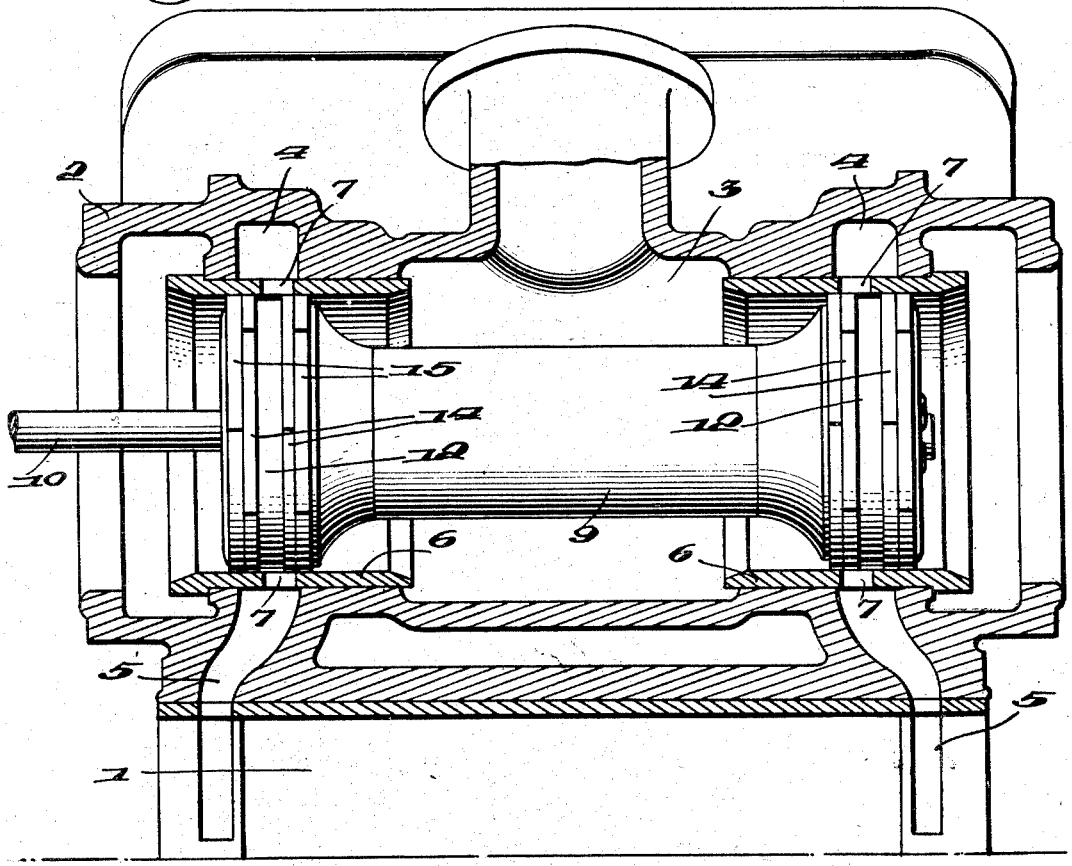
Fig. 1 is a sectional view of a portion of a steam cylinder and valve chest, with parts omitted, and showing the valve in elevation.

The invention is shown in Fig. 1 in connection with a steam cylinder, such as is used on a steam locomotive and which is designated generally by the numeral 1, with its steam chest designated 2, having a steam inlet 3, exhaust at 4, and passageways 5, leading to opposite ends of the cylinder 1. Mounted in each end of the steam chest 2, is a bushing 6, having ports 7 therein, registering with the passageways 5 and exhaust outlets 4, there being usually either six or eight ports 7 in the bushing, and separated by bridges 8 therebetween.

The valve shown is of the piston type, having a spool 9 attached to a valve stem 10 through spiders 11 at opposite ends of the spool.

Between the opposite ends of the spool 9 and the spiders 11 are sets of packing rings, one of which operates against steam pressure from the steam inlet 3, while the other set of packing rings operates against the exhaust steam to the outlets 4. These sets of packing rings are separated by a division ring 12, which is substantially T-shaped in cross-section with lateral flanges 13, extending approximately throughout the length of the space between the spider ring 11, and the opposite ends of the spool 9. This leaves a groove on each side of the division ring 12 and between the same and the adjacent side face of the spool head 9 or spider ring 11, within which the respective steam and exhaust packing rings are mounted.

The respective steam and exhaust packing ring sets are similar in structure, except that they are reversed with respect to each other, and only one will be described in detail.

Each set of packing rings comprises an inner ring 14 and an outer ring 15, each of which is made in sections with the joints staggered relative to each other, and will be made in four sections where there are eight bridges separating the ports 7 or in three sections where there are six such bridges, so that the ends of the sections will ride on bridges and will not be located at the ports 7. The packing ring 14 is in laterally abutting relation with a side face of the division ring 12, while the packing ring 15 is in abutting relation with a side face of the head of the spool 9, and is provided with a flange 16 overlapping said flange or the flange of the spider ring 11.

The opposing faces of the packing rings 14 and 15 have grooves 17 therein receiving the head 18 of a T-shaped retainer ring 19. This retainer ring 19 is in one piece with its inner diameter only sufficiently larger than the periphery of the flange 13 on the division ring 12 for application and removal thereto without appreciable force. On opposite sides of the retainer ring 19 are springs 20, bearing outwardly against the inner edges of the packing rings 14 and 15, tending to expand the latter against the inner face of the valve bushing 6 to prevent leakage of steam by the respective rings.

Figure 2:
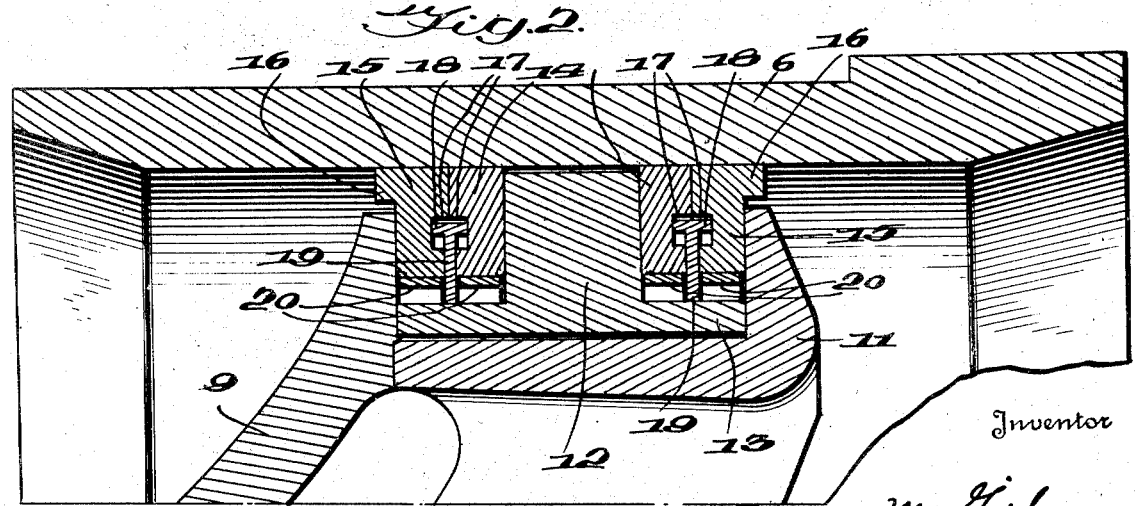
Fig. 2 is an enlarged sectional view through a portion of the valve and bushing, showing the application of the invention thereto.

In assembling the parts of the valve, the sets of packing rings will be assembled first on the flanges of the division ring 12 and then inserted thereon over the spider ring 11 and secured thereby in an assembly to the piston rod 10, ready for insertion into the steam chest of the engine. Before insertion, the springs 20 initially press outward on the sectional packing rings 14 and 15, expanding the latter relative to the retainer ring 19, until the under edges of the grooves 17 engage the under sides of the head 18 of the retainer ring 19, the clearance provided by the grooves 17 then being on the outer side of the head 18. When the piston is inserted into the valve bushing 6, each set of packing rings will be compressed initially substantially as shown in Figs. 2 and 3 with the clearance provided by the grooves 17 beneath the head 18 of the retainer ring. The retainer ring 19 securely holds the sectional packing rings 14 and 15 in place in the spaces provided in the valve on opposite sides of the divisional ring 12 to facilitate assembly of the valve in passing through the bushings in the steam chest, first, through one bushing, and then another. Unless the sectional packing rings were held in place and against undue expansion, it would be difficult to insert the piston valve into the steam chest and the bushings thereof or to remove it therefrom because the sectional packing rings would hang on edges of the valve bushings toward the steam inlet 3, and interfere with the introduction or removal of the valve relative thereto.

As shown in Figs. 3 and 4, the packing ring assembly is held in proper position relative to the bushing 6 by a dowel pin 21, which is inserted through the division ring 12, the packing rings 14 and 15, and the retainer ring 19 at the lower side of the piston, which prevents these parts from turning relative to the adjacent portions of the piston through which this dowel pin extends, as shown in Fig. 3, and thereby holds the sections of the packing rings 14 and 15 with their edges riding on the bridges 8 in the bushings 6, but the staggered relation of the split ends of the packing rings provides for the assembly of these in stepwise relation. As shown in Fig. 4, each of the springs 20 is made in a single piece but split with its ends lying on opposite sides of the dowel pin 21, so as to hold this spring against turning, whereby it will bear uniformly on the sections of the packing rings.

As mentioned above, where the bushing 6 is provided with six or eight bridges and complementary ports, the packing rings 14 and 15 will have three or four sections each, respectively, so as to bear on every other one of the bridges and the section ends of one ring alternate with respect to the other, so that the ends of both rings do not bear on any one bridge. This arrangement makes the packing rings steam tight by reason of the staggered joints thereof, so as to prevent a direct passageway through the sections at any point and steam could not pass under the ring sections through a joint since the space therebetween is closed by the retainer ring which makes a partition for each half of the ring and steam would be confined to a side of the retainer and would not be allowed to pass from one of the sectional openings to another in the respective packing rings. This relation effectively conceals the packing rings against leakage of steam from one to the other.

After the packing rings have been used for a period of time, they will wear off at their lateral peripheral edges where the rings contact the surface of the valve bushings, but maintained packing is provided by reason of the expansion of the packing rings 14 and 15, by the springs 20 to maintain a tight fit with the bushings. This will continue until the packing rings have been expanded to such an extent that the lower edges of the grooves 17 engage the under edges of the head 18 of the retainer ring, and further expansion is thereby prevented. When this occurs, the retainer rings 19 may be removed and replaced by retainer rings of greater radial width which will allow still more expansion of the packing rings before it is necessary to replace those, thus reducing the operating cost of the use of this packing. This substitution of a larger retainer ring will also recenter the valve since the packing would have a tendency to ride on top of the retainer ring. Where the wearing surface of the valve bushings are bored, it will not be necessary to renew the valve assembly parts comprising the division ring, spool and spider ring, in order to retain the center position of the valve because the packing retainer ring will not allow the valve to get off center more than $\frac{3}{32}$ of an inch, as the packing is made to fit the diameter of the bushings and as the retainer ring stops the packing from moving out beyond $\frac{3}{32}$ of an inch, until a new and larger diameter retainer ring is applied.

Where the valve bushing is bored ¼ inch larger in diameter, to use valve assembly all that would be necessary to keep the valve in center with the bushings and valve stem would be to manufacture the packing to suit this diameter since the valves on a locomotive are in a horizontal position and any out of alignment or out of center position of the valve would be at the bottom. The packing rings may be made wider, if desired, from the grooves 17 to the peripheries thereof, to accommodate for any desired size of valve bushings or degree of wear which may be encountered.

The T-shaped retainer rings 19 carry the weight of the valve directly thereon at the bottom, during coasting of the engine, instead of on the flanges of the spool and spider. This is true because the space between the heads 18 of the retainer rings 19 and the outer walls of the grooves 17 is appreciably less than the space between the flanges 16 of the packing rings 15 and the adjacent flanges of the spool 9 and spider 11, so that said flanges do not contact in any degree of wear of the packing rings. The retainer rings can be renewed when they become worn, much more readily and at less expense than the spool and spider.

I claim:

1. In a structure of the character described, the combination with a body having a circumferential channel, expansible packing rings arranged in side-by-side relation in said channel and having mating grooves in facing sides thereof, a retainer ring free from the body and interposed between the packing rings with means received in said grooves, said retainer ring having the inner edge thereof approximately of the same diameter as the bottom of the channel having relatively close sliding fit therewith after assembly, and expanding springs on opposite sides of the retainer ring between the bottom of the channel and the packing rings.

2. In a structure of the character described, the combination with a body having means forming a circumferential channel therein, of expansible packing rings arranged in side-by-side relation in said channel with opposed faces thereof abutting at least at the peripheral portions thereof, said rings having mating grooves in facing sides thereof, and a retainer ring approximately T-shaped in cross-section free from the channel forming means, slidable axially relative to the bottom thereof after assembly, and interposed between the inner portions of the packing rings with side flanges received in said grooves, and resilient means inwardly of the packing rings and bearing radially thereon.

3. In a structure of the character described, the combination with a body having means forming a circumferential channel therein, of expansible packing rings arranged in side-by-side relation in said channel with opposed faces thereof abutting at least at the peripheral portions thereof, each of said rings being split with separable ends, the ends of one ring being out of transverse alignment with the ends of the other ring, said rings having mating grooves in facing sides thereof, a retainer ring approximately T-shaped in cross-section free from the channel forming means and interposed between the inner portions of the packing rings with side flanges received in said grooves, said retainer ring having the inner edge thereof fitting the bottom of the channel and slidable relative thereto after assembly, and expanding springs on opposite sides of the retainer ring between the bottom of the channel and the packing rings.

4. In a structure of the character described, the combination with a body having means forming a circumferential channel therein, of expansible packing rings arranged in side-by-side relation in said channel, said packing rings having grooves in facing sides thereof, a retainer ring separated from the channel forming means and having the inner edge thereof substantially fitting the bottom of the channel and slidable relative thereto after assembly, said retainer ring having portions extending into the grooves, and resilient means interposed between the bottom of the channel and the inner edges of the packing rings, said packing rings being arranged with the inner edges thereof spaced from the bottom of the channel with an expansion space therebetween for the resilient means appreciably greater than the spaces between the outer walls of the grooves and the retainer ring portions therein, whereby the retainer ring and packing rings carry the weight at the lower side of the body.

5. In a structure of the character described, the combination with a body having means forming a circumferential channel therein, of expansible packing rings arranged in side-by-side relation in said channel, said packing rings having grooves in facing sides thereof, a retainer ring separated from the channel forming means and having the inner edge thereof substantially fitting the bottom of the channel and slidable relative thereto after assembly, said retainer ring having portions extending into the grooves, and leaf-springs interposed between the bottom of the channel and the inner edges of the packing rings and having space for movement therebetween appreciably greater than the space between the outer edges of the grooves and the retainer ring portions, whereby the retainer ring and packing rings carry the weight at the lower side of the body.

PERCY M. GILMER.